Sept. 15, 1942.　　　R. L. OHLS　　　2,295,862

VALVE

Filed May 4, 1942

Robert L. Ohls
INVENTOR.
BY
ATTORNEYS

Patented Sept. 15, 1942

2,295,862

UNITED STATES PATENT OFFICE 2,295,862

VALVE

Robert L. Ohls, Houston, Tex., assignor to Reed Roller Bit Company, Houston, Tex., a corporation of Texas Application May 4, 1942, Serial No. 441,574

9 Claims. (Cl. 251—102)

The present invention relates to valves having a carrier and closure means mounted on the carrier for retraction from their seating surface and more particularly has reference to the mechanism in such type of valve, for effecting the retraction.

Many mechanisms have been devised to effect the retraction of valve closure members from the wall of the valve chambers in which they are positioned or from seats surrounding flow ports, and varying degrees of success have been obtained. Some of the mechanisms which operate fairly successfully are complicated and expensive to make and repair whereas the simple devices are in most instances ineffective, especially when incorporated in valves for controlling high pressure fluid flow.

The principal object of the present invention is to provide in a valve of the retractable closure type, a retracting mechanism which will avoid the disadvantages of the prior art structures.

Another object of this invention is to provide means for directly prying closure members from their seats.

Still another object of this invention is to provide means for directly prying closure members from their seats and operable by closure member displacing means during the taking up of lost motion in a connection between the closure member and its displacing means.

A further object of this invention is to provide the retractable closure members of a valve with lever means engageable with the seat of the closure member and displaceable for prying the closure member from its seat.

Other objects of the invention will appear hereinafter in the description taken in conjunction with the accompanying drawing which illustrates two embodiments of the invention.

Figures 1, 2, 3, 4:
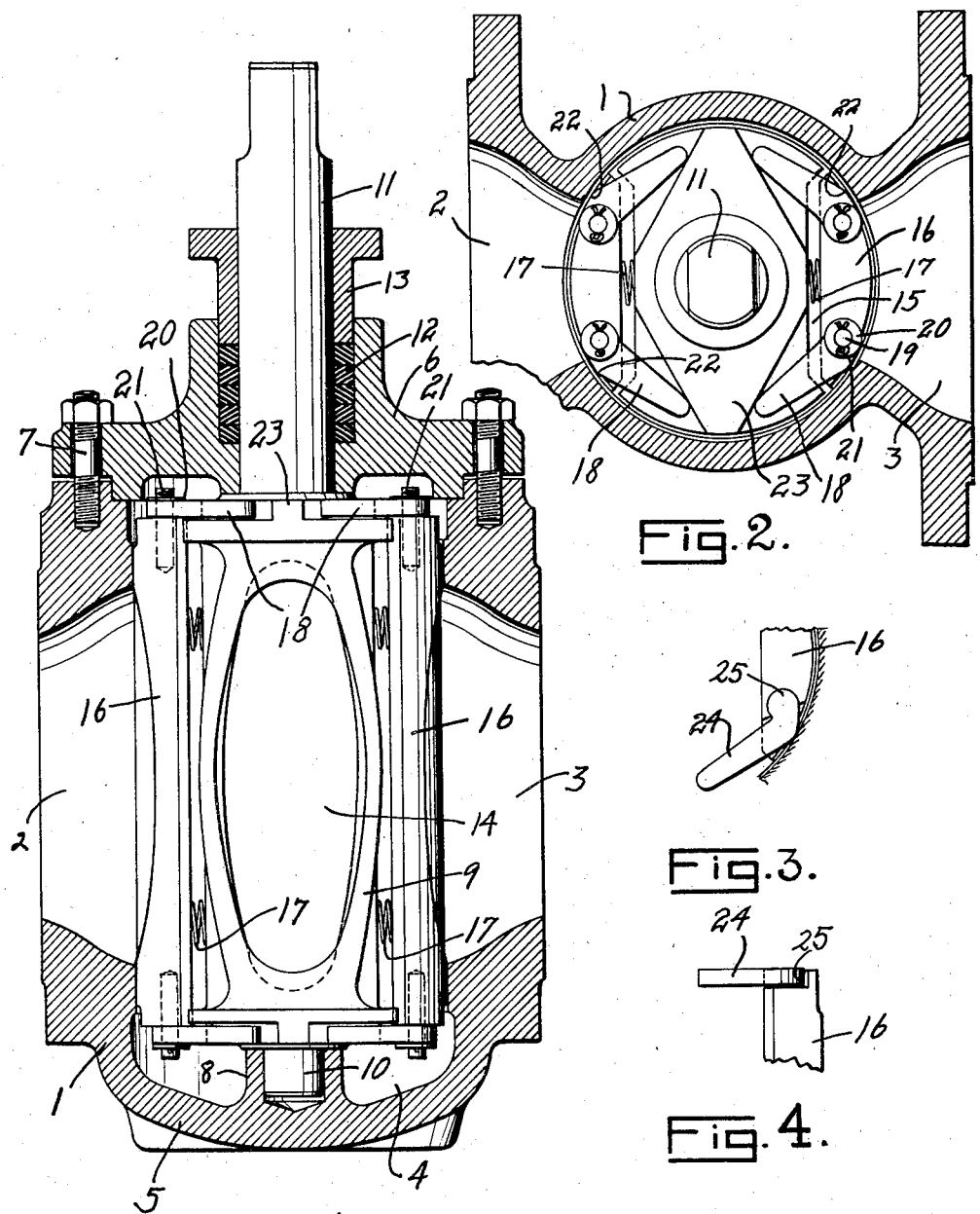
Fig. 1 is a fragmentary longitudinal cross-sectional view of a valve constructed in accordance with the present invention.
Fig. 2 is another longitudinal sectional view taken on a plane perpendicular to that on which Fig. 1 was taken, showing the valve carrier and associated structure in plan.
Fig. 3 is a fragmentary detailed plan view showing a modified form of retracting lever.
Fig. 4 is an elevational view of the structure shown in Fig. 3.

As shown in the drawing, the valve embodying the features of the present invention comprises a body or casing 1 having flow openings 2 and 3 either of which may serve as the inlet or the outlet for fluid entering or discharging from the body 1.

Extending transversely through the body 1 is a valve chamber 4 having ports which communicate with said flow openings. One end of the chamber 4 is closed by a fixed wall 5 whereas the other end is closed by the bonnet 6 which is secured in place by studs 7. A bearing boss 8 is carried by the end wall 5.

In the chamber 4 is rotatably mounted a carrier 9 having a bearing pin 10 seated in the boss 8 and an actuating stem 11 extending through an opening in the bonnet 6. The opening in the bonnet 6 through which the stem extends is enlarged to form a space to receive packing 12 which is compressed by the plunger 13. At its outer end stem 11 is shaped to receive a wrench or other operating device.

Carrier 9 is of general cylindrical shape and has a flow opening 14 extending transversely therethrough to provide for flow of fluid through the valve and on each side of the flow opening 14 is recessed as shown in Fig. 2 and indicated by reference character 15 to receive closure members 16 which are in the form of cylindrical segments. The recesses 15 are of sufficient depth radially of the carrier to permit the closure members to be retracted from the wall of the valve chamber 4 and are sufficient length circumferentially of the carrier to provide a lost-motion connection between the carrier and closure members so that the carrier may be rotated through a limited angle without circumferentially displacing the closure members. Springs 17 or other suitable means are provided to urge the closure members against their seats on the wall of the valve chamber 4.

For retracting the closure members 16 from contact with the wall of chamber 4 to break any seal or adherence between the same the present invention utilizes levers 18 which are pivotally mounted on the closure members 16 at one or both ends thereof adjacent the leading and trailing edges thereof. As shown in Figs. 1 and 2 levers 18 are pivotally connected at one end thereof to the ends of closure members 16 by pins or studs 19 mounted in the ends of said closure members. Washers 20 may be placed over the levers 18 and cotter pins 21 or other suitable means used to retain the levers assembled on the studs 19.

Levers 18 are bent or otherwise shaped to provide fulcrum portions 22 between the ends thereof but closer to the pivoted ends than to the free ends as shown in Fig. 2. These fulcrums are adapted to engage the wall of the valve chamber 4 and when the free ends of the levers are displaced to press the fulcrums against the walls of the valve chamber, the levers will act to pry the closure member away from the valve chamber wall.

For actuating the levers 18 to accomplish the prying of the closure members away from the valve chamber wall, there is provided on the carrier 9 at either the juncture of stem 11 or the juncture of the pin 10, or both, a diamond-shaped cam 23. These cams are of such size and extent and the levers 18 are of such length that when the closures are in a desired location the carrier may be positioned so that each diamond-shaped cam 23 is in a neutral position whereby the fulcrums 22 of the levers 18 will not be pressed against the valve chamber wall and the closure members 16 can be effectively seated against the wall of chamber 4. However, when the stem 11 is rotated in one direction one pair of opposite cam edges of each diamond-shaped cam will displace the free ends of the levers associated therewith to press the fulcrums 22 of said levers against the valve chamber wall and pry the edge portions of the closure members 16 adjacent which said levers are attached away from the valve chamber wall. During this movement of the carrier no circumferential displacement of the closure members will take place due to the lost-motion connection. Also since the other pair of opposite cam edges of the cam 23 are moved away from the free ends of the levers associated therewith, they will not be actuated.

Upon rotating the stem 11 in the opposite direction, the other set of levers 18 will be actuated to pry the other edges of the closure members away from the valve chamber wall in the same manner described above.

Instead of attaching the levers to the closure members 16 by pins or studs, they may be formed with enlarged ends which are fitted into sockets in the closure members. As shown in Figs. 3 and 4 the closure members are cut away at one end adjacent the side edges thereof for a depth substantially equal to the thickness of levers 24, and generally cylindrical sockets are formed adjacent the edges of the uncut portion. Lateral openings are provided in the sides of the sockets through which the levers extend. It should be noted that the ends 25 of the levers which are in the sockets are enlarged and are larger in diameter than the width of the lateral openings to retain said ends of the levers in said sockets.

Levers 24 operate in the same manner as levers 18 of Figs. 1 and 2 but may be more easily replaced when worn.

From the foregoing description it will be appreciated that the present invention provides a simple effective structure for directly prying the closure members from the valve chamber wall by levers directly engaging both the closure members and the valve chamber wall. This direct action is more effective and easily accomplished than an indirect action in whch the closure members are pulled away from the valve chamber wall.

It will be noted furthermore that the mechanism described is operative in such a manner that whichever the direction of movement of the stem 11 may be, those edges of the closure members which are to trail in the ensuing sideways movement of the closure members will be lifted from their seats whereas the leading edges of such closure members will be allowed to remain against their seats. This has the advantage that at all times during sliding or sideways movement of the closure members the leading edge of the closure member will serve to scrape or sweep clean that portion of the wall of the chamber against which the closure member will subsequently seat. Thus the closure member will not be allowed to seat against some gritty or other hard material which would hold it partly away from its surface on which it is intended to seat. By this means the cutting away of the closure member by erosion along that surface which is adapted to form its seat is avoided.

Having described my invention, I claim:

1. In a valve, a valve body having a ported valve chamber, a carrier rotatably mounted in said chamber, a closure member mounted on said carrier with a lost-motion connection between the same and the carrier and retractable from the wall of said chamber, means for rotating said carrier to displace the closure member to and from closed position after taking up the lost motion between the carrier and closure member, a lever pivotally connected at one end to the closure member at one end of the latter adjacent an edge thereof which is a leading edge in one direction of movement to and from the closed position, said lever having a fulcrum intermediate its ends to engage the wall of the valve chamber, and means on the carrier in engagement with the free end of said lever and operable during the taking up of the lost motion between the carrier and closure to press the fulcrum of the lever against the chamber wall and retract the portion of the closure to which the lever is pivoted from the chamber wall.

2. In a valve, a valve body having a ported valve chamber, a carrier rotatably mounted in said chamber, a closure member mounted on said carrier with a lost-motion connection between the same and the carrier and retractable from the wall of said chamber, means for rotating said carrier to displace the closure member to and from closed position after taking up the lost motion between the carrier and closure member, said closure member having a socket provided in one end thereof adjacent an edge which is a leading edge in one direction of movement to and from the closed position, a lever having one end engaging in said socket and extending laterally from the socket, said lever having a fulcrum intermediate its ends to engage the wall of the valve chamber, and means on the carrier in engagement with the free end of said lever and operable during the taking up of the lost motion between the carrier and closure to press the fulcrum of the lever against the chamber wall and retract the portion of the closure containing the socket from the chamber wall.

3. In a valve, a valve body having a ported valve chamber, a carrier rotatably mounted in said chamber, a closure member mounted on said carrier with a lost-motion connection between the same and the carrier and retractable from the wall of said chamber, means for rotating said carrier to displace the closure member to and from closed position after taking up the lost motion between the carrier and closure member, said closure member having a cylindrical socket provided in one end thereof adjacent an edge which is a leading edge in one direction of movement to and from closed position, said socket having a lateral opening in the wall thereof, a lever having an enlarged end in said socket and extending through said lateral opening, said lever having a fulcrum intermediate its ends to engage the wall of the valve chamber, and means on the carrier in engagement with the free end of said lever and operable during the taking up of the lost motion between the carrier and closure to press the fulcrum of the lever against the chamber wall and retract the portion of the closure containing the socket from the chamber wall.

4. In a valve, a valve body having a ported valve chamber, a carrier rotatably mounted in said chamber, a closure member mounted on said carrier with a lost-motion connection between the same and the carrier and retractable from the wall of said chamber, means for rotating said carrier to displace the closure member to and from closed position after taking up the lost motion between the carrier and closure member, a lever pivotally connected at one end to the closure member at one end of the latter adjacent one edge thereof, a second lever similarly connected to the closure member adjacent the other edge thereof, each of said levers having a fulcrum intermediate its ends to engage the wall of the valve chamber, and means on the carrier in engagement with the free ends of said levers and operable during the taking up of lost motion between the carrier and closure in one direction of rotation of the carrier to press the fulcrum of one lever against the chamber wall to retract one edge of the closure member from the chamber wall and operable during the taking up of lost motion between the carrier and closure member in the opposite direction of rotation of the carrier to press the fulcrum of the other lever against the chamber wall and retract the other edge of the closure member from the chamber wall.

5. In a valve, a valve body having a ported valve chamber, a carrier rotatably mounted in said chamber, a pair of closure members mounted on opposite sides of said carrier with a lost-motion connection between each closure member and the carrier, each closure member being retractable from the chamber wall, means for rotating the carrier to displace the closure members to and from closed positions after taking up the lost motion in the connections between the carrier and closure members, a pair of levers each pivotally connected at one end to one end of one closure member, a pair of levers each pivotally connected at one end to the corresponding end of the other closure member, the pivotal connection of one lever of each pair being adjacent one edge of like closure members and the pivotal connection of the other lever of each pair being adjacent the other edge of the closure members, each of said levers having a fulcrum intermediate its ends to engage the wall of the valve chamber, and means on the carrier in engagement with the free ends of said levers and operable during the taking up of lost motion between the carrier and closure members in one direction of rotation of the carrier to press the fulcrum of one lever of each pair against the chamber wall to retract the portions of the closures to which said levers are pivoted from the chamber wall and operable during the taking up of lost motion between the carrier and closure members in the opposite direction of rotation of the carrier to press the fulcrums of the other levers against the chamber wall and retract the portions of the closure members to which the last-mentioned levers are pivoted.

6. In a valve of the character described having a ported valve chamber and a closure member displaceable over the port to close and open the latter, means for displacing the closure member to open and closed positions, lever means operable by the displacing means and engaging the wall of the valve chamber for prying the closure member away from the chamber wall.

7. In a valve, a ported valve chamber, a carrier rotatably mounted in said chamber, a closure member mounted on said carrier for displacement by the carrier to close and open the port in the chamber and retractable from the chamber wall, means for rotating the carrier, lever means pivotally connected to the closure member and engaging the valve chamber wall, and means for actuating said lever means to pry the closure member away from the chamber wall.

8. In a valve, a ported valve chamber, a carrier rotatably mounted in said chamber, a closure member mounted on said carrier with a lost-motion connection between the carrier and closure member for displacement by the carrier to close and open the port in the chamber and retractable from the chamber wall, means for rotating the carrier, lever means pivotally connected to the closure member and engaging the valve chamber wall, and means for actuating said lever means to pry the closure member away from the chamber wall, said actuating means being carried by the carrier and operable during the taking up of lost motion in the connection between the carrier and closure member for actuating said lever means.

9. In a valve of the character described having a ported valve chamber and a closure member displaceable over the port to close and open the latter, means for displacing the closure member to open and closed positions, and lever means operable by the displacing means and engaging the wall of the valve chamber for prying away from the chamber wall that edge of the closure member which will form the trailing edge in the ensuing displacement of the closure member.

ROBERT L. OHLS.